(12) United States Patent
Wakabayashi

(10) Patent No.: US 8,306,588 B2
(45) Date of Patent: Nov. 6, 2012

(54) MOBILE DEVICE AND RADIO COMMUNICATION PORTION OF MOBILE DEVICE

(75) Inventor: Naoyuki Wakabayashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 188 days.

(21) Appl. No.: 12/844,298

(22) Filed: Jul. 27, 2010

(65) Prior Publication Data

US 2011/0207510 A1 Aug. 25, 2011

(30) Foreign Application Priority Data

Jul. 27, 2009 (JP) ................. 2009-173795

(51) Int. Cl.
*H04W 88/06* (2009.01)
(52) U.S. Cl. .............. 455/575.7; 455/97; 455/562.1; 455/552.1; 343/702
(58) Field of Classification Search .......... 455/575.7, 455/13.3, 97, 562.1, 575.5, 558; 343/702
See application file for complete search history.

(56) References Cited

U.S. PATENT DOCUMENTS

| 5,828,951 | A | * | 10/1998 | Suemitsu | ............... 455/575.7 |
| 7,120,469 | B1 | | 10/2006 | Urakawa | |
| 2001/0039198 | A1 | * | 11/2001 | Onishi et al. | ............... 455/562 |
| 2007/0093282 | A1 | * | 4/2007 | Chang et al. | ............... 455/575.7 |

FOREIGN PATENT DOCUMENTS

| JP | 4059605 B2 | | 12/2007 |
| JP | 2008-92273 | | 4/2008 |
| JP | 2008092273 A | * | 4/2008 |

* cited by examiner

*Primary Examiner* — Ajit Patel
*Assistant Examiner* — Erica Navar
(74) *Attorney, Agent, or Firm* — Crowell & Moring LLP

(57) ABSTRACT

This mobile device includes a control portion determining whether or not a selection antenna module and a selection circuit module are matched to each other, and the control portion controls radio communication by the selection antenna module and the selection circuit module to be disabled when the selection antenna module and the selection circuit module are not matched to each other and controls radio communication by the selection antenna module and the selection circuit module to be enabled when the selection antenna module and the selection circuit module are matched to each other.

8 Claims, 8 Drawing Sheets

| BIT POSITION | 0 | 1 | 2 | 3 | 4 | ... | 15 |
|---|---|---|---|---|---|---|---|
| RADIO SYSTEM | GSM | PHS | 2G | 3G | WLAN | ... | WiMAX |

| BIT POSITION | 0 | 1 | 2 | 3 | 4 | ... | 15 |
|---|---|---|---|---|---|---|---|
| RADIO SYSTEM | 0 | 0 | 0 | 1 | 0 | ... | 0 |

MOBILE DEVICE AND RADIO COMMUNICATION PORTION OF MOBILE DEVICE

BACKGROUND OF THE INVENTION

1. Field of the Invention

The present invention relates to a mobile device and a radio communication portion of a mobile device, and more particularly, it relates to a mobile device capable of corresponding to a plurality of radio communication standards and a radio communication portion of the mobile device.

2. Description of the Background Art

A mobile device capable of corresponding to a plurality of radio communication standards is known in general, as disclosed in Japanese Patent No. 4059605, for example.

The aforementioned Japanese Patent No. 4059605 discloses a mobile communication device comprising a communication device main body and a communication module including radio communication control means for controlling radio communication and an antenna, being detachable with respect to the communication device main body. In this mobile communication device, a communication module corresponding to a desired communication standard is selected from a plurality of communication modules corresponding to different communication standards to be mounted on the communication device main body, whereby radio communication of the desired communication standard is performed.

In the mobile communication device disclosed in the aforementioned Japanese Patent No. 4059605, however, the communication module includes both the radio communication control means and the antenna, and hence the module mounted on the communication device main body disadvantageously increases in size. Thus, when mounting the communication module on the communication device main body, flexibility of arrangement is reduced, and hence it is difficult to arrange the antenna in the communication module in an appropriate position of the communication device main body. Therefore, it is difficult to obtain excellent communication characteristics.

In this regard, a mobile device in which excellent communication characteristics can be obtained by improving flexibility of arrangement of an antenna with respect to a mobile device body is known in general, as disclosed in Japanese Patent Laying-Open No. 2008-092273, for example.

In the mobile phone according to the aforementioned Japanese Patent Laying-Open No. 2008-092273, however, the mobile phone body is loaded with the plurality of matching circuits (circuit modules) beforehand in order to correspond to the plurality of antenna modules, and hence the mobile phone body disadvantageously increases in size.

SUMMARY OF THE INVENTION

The present invention has been proposed in order to solve the aforementioned problems, and an object of the present invention is to provide a mobile device and a radio communication portion of a mobile device in which excellent communication characteristics can be obtained by improving flexibility of arrangement of antenna modules with respect to a mobile device body while the mobile device body is inhibited from increasing in size.

A mobile device according to a first aspect of the present invention comprises a mobile device body, a single selection antenna module mountable on the mobile device body, selected from a plurality of antenna modules corresponding to a plurality of radio communication standards, a single selection circuit module mountable on the mobile device body, selected from a plurality of circuit modules corresponding to a plurality of radio communication standards, and a control portion determining whether or not a combination of the selection antenna module and the selection circuit module is a matching combination in radio communication standards, wherein the control portion is formed to control radio communication by the selection antenna module and the selection circuit module to be disabled when determining that the selection antenna module and the selection circuit module are not matched to each other and control radio communication of a radio communication standard corresponding to the selection antenna module and the selection circuit module to be enabled when determining that the selection antenna module and the selection circuit module are matched to each other. The "radio communication standard(s)" in the present specification indicates a wide concept including not only radio systems such as GSM, 2G, 3G, WiMAX and PHS but also frequencies employed for radio communication.

As hereinabove described, the mobile device according to the first aspect of the present invention comprises the single selection antenna module mountable on the mobile device body, selected from the plurality of antenna modules corresponding to the plurality of radio communication standards and the single selection circuit module mountable on the mobile device body, selected from the plurality of circuit modules corresponding to the plurality of radio communication standards, whereby a module including an antenna mounted on the mobile device body decreases in size, and hence flexibility of arrangement of the antenna modules with respect to the mobile device body can be improved as compared with a case where the selection circuit module and the selection antenna module are integrated with each other. Thus, the antenna modules can be easily arranged in a position where receiving sensitivity is excellent, and hence excellent communication characteristics can be obtained. The selection circuit module matched to the selection antenna module is selected from the plurality of circuit modules to be mounted on the mobile device body, whereby the mobile device body may not be loaded with the plurality of circuit modules corresponding to the plurality of antenna modules beforehand. Thus, the mobile device body can be inhibited from increasing in size. Therefore, in the mobile device according to the first aspect, excellent communication characteristics can be obtained by improving flexibility of arrangement of the antenna modules with respect to the mobile device body while the mobile device body is inhibited from increasing in size. Further, the control portion determining whether or not a combination of the selection antenna module and the selection circuit module is a matching combination in the radio communication standards is provided and is formed to control radio communication by the selection antenna module and the selection circuit module to be disabled when determining that the selection antenna module and the selection circuit module are not matched to each other and control radio communication of the radio communication standard corresponding to the selection antenna module and the selection circuit module to be enabled when determining that the selection antenna module and the selection circuit module are matched to each other, whereby the control portion can prevent a combination of the selection antenna module and the selection circuit module not matched to each other from performing radio communication also when the antenna modules and the circuit modules are separated from each other to be capable of being individually mounted on the mobile device body. Thus, violation of laws and regulations can be prevented and a problem with communication caused by the selection antenna module and the selection circuit module not matched to each other can be prevented from occurrence (prescribed communication performance can be prevented from being unsatisfied and a damage of the selection circuit module caused by a reflected wave from the selection antenna module not matched to the selection circuit module can be prevented from occurrence, for example).

In the aforementioned mobile device according to the first aspect, the control portion is preferably formed to acquire information or characteristics for determining whether or not the selection antenna module and the selection circuit module are matched to each other from at least the selection antenna module and determine whether or not the selection antenna module and the selection circuit module are matched to each other on the basis of the acquired information or characteristics. According to this structure, the control portion can easily determines whether or not the selection antenna module and the selection circuit module are matched to each other using the information or characteristics for determining whether or not the selection antenna module and the selection circuit module are matched to each other.

In the aforementioned mobile device according to the first aspect, the selection antenna module and the selection circuit module are preferably formed to transmit a high-frequency signal to each other without contact when the selection antenna module and the selection circuit module are matched to each other. According to this structure, a high-frequency signal can be easily transmitted between the selection antenna module and the selection circuit module provided separately from each, other without using a cable or the like and without contact therebetween.

In this case, the control portion is preferably formed to acquire first identification information provided peculiarly with respect to the selection antenna module and determine whether or not the selection antenna module and the selection circuit module are matched to each other on the basis of the acquired first identification information. According to this structure, it is not necessary to acquire the characteristics using a measuring instrument or the like, and whether or not the selection antenna module and the selection circuit module are matched to each other can be determined on the basis of the peculiar first identification information provided beforehand to the selection antenna module.

In the aforementioned structure in which the control portion acquires the first identification information, the control portion preferably includes a body side control portion provided in the mobile device body, and the body side control portion is preferably formed to acquire the first identification information of the selection antenna module and second identification information provided peculiarly with respect to the selection circuit module and determine whether or not the selection antenna module and the selection circuit module are matched to each other on the basis of the acquired first identification information and the second identification information, and is preferably formed to disable radio communication by controlling radio communication by the mobile device body to be stopped when the selection antenna module and the selection circuit module are not matched to each other and enable radio communication when the selection antenna module and the selection circuit module are matched to each other. According to this structure, the body side control portion stops radio communication when the selection antenna module and the selection circuit module are not matched to each other, whereby violation of laws and regulations can be reliably prevented and a problem with communication caused by the selection antenna module and the selection circuit module not matched to each other can be reliably prevented from occurrence (prescribed communication performance can be reliably prevented from being unsatisfied and a damage of the selection circuit module caused by a reflected wave from the selection antenna module not matched to the selection circuit module can be reliably prevented from occurrence, for example).

In the aforementioned structure in which the control portion includes the body side control portion, the selection antenna module and the selection circuit module preferably include a first storage portion storing the first identification information and a second storage portion storing the second identification information, respectively, and the body side control portion is preferably formed to acquire the first identification information and the second identification information by reading out the first identification information and the second identification information from the first storage portion and the second storage portion, respectively. According to this structure, the body side control portion can acquire the first identification information and the second identification information through simply reading out the first identification information and the second identification information from the first storage portion and the second storage portion, respectively.

In the aforementioned structure in which the control portion includes the body side control portion, the selection antenna module preferably has a first conductive terminal or a first concavo-convex portion so arranged as to correspond to the first identification information, the selection circuit module preferably has a second conductive terminal or a second concavo-convex portion so arranged as to correspond to the second identification information, and the body side control portion is preferably formed to acquire the first identification information of the selection antenna module on the basis of arrangement of the first conductive terminal or the first concavo-convex portion and acquire the second identification information of the selection circuit module on the basis of arrangement of the second conductive terminal or the second concavo-convex portion. According to this structure, no storage portion for storing identification information may be provided in each of the selection antenna module and the selection circuit module, and the first identification information (second identification information) can be acquired by simply arranging the first conductive terminal (second conductive terminal) or the first concavo-convex portion (second concavo-convex portion) at a prescribed position.

In the aforementioned structure in which the control portion acquires the first identification information, the control portion preferably includes a circuit side control portion provided in the selection circuit module, and the circuit side control portion is preferably formed to disable radio communication by controlling radio communication by the mobile device body to be stopped when the selection antenna module and the selection circuit module are not matched to each other and enable radio communication when the selection antenna module and the selection circuit module are matched to each other. According to this structure, the circuit side control portion provided in the selection circuit module determines whether or not the selection antenna module and the selection circuit module are matched to each other, and hence no identification information may be provided in the selection circuit module, and hence no identification information may be provided with respect to the selection circuit module.

In the aforementioned structure in which the control portion includes the circuit side control portion, the selection antenna module preferably includes a first storage portion storing the first identification information, and the circuit side control portion is preferably formed to acquire the first identification information by reading out the first identification information from the first storage portion. According to this structure, the circuit side control portion can acquire the first identification information through simply reading out the first identification information from the first storage portion.

In the aforementioned structure in which the control portion includes the circuit side control portion, the selection antenna module preferably has a first conductive terminal or a first concavo-convex portion so arranged as to correspond to the first identification information, and the circuit side control portion is preferably formed to acquire the first identification information of the selection antenna module on the basis of arrangement of the first conductive terminal or the first concavo-convex portion. According to this structure, no storage portion for storing the first identification information may be provided in the selection antenna module, and the first identification information can be acquired by simply arranging the first conductive terminal or the first concavo-convex portion at a prescribed position.

In the aforementioned structure in which the control portion acquires the characteristics for determining whether or not the selection antenna module and the selection circuit module are matched to each other, the control portion is preferably formed to determine whether or not the selection antenna module and the selection circuit module are matched to each other on the basis of the characteristics regarding a size of a reflected wave from the selection antenna module, of a signal wave transmitted from the selection circuit module to the selection antenna module. According to this structure, no peculiar identification information may be provided beforehand to each of the selection antenna module and the selection circuit module.

The aforementioned mobile device according to the first aspect preferably further comprises a mounting preventing portion preventing mounting of at least either the selection antenna module or the selection circuit module on the mobile device body, and the control portion is formed to control the mounting preventing portion to prevent mounting of at least either the selection antenna module or the selection circuit module on the mobile device body when the selection antenna module and the selection circuit module are not matched to each other. According to this structure, when the selection antenna module and the selection circuit module are not matched to each other, at least either the selection antenna module or the selection circuit module is prevented from being mounted on the mobile device body by the mounting preventing portion, and hence radio communication can be reliably prevented from being performed by the selection antenna module and the selection circuit module not matched to each other.

In this case, the mounting preventing portion preferably includes a projecting portion capable of moving to a position where the projecting portion engages or does not engage with an engaging portion provided on at least either the selection antenna module or the selection circuit module and an urging member urging at least either the selection antenna module or the selection circuit module in a discharging direction from the mobile device body, and at least either the selection antenna module or the selection circuit module is preferably formed to be moved in the discharging direction from the mobile device body by urging force generated by the urging member and be prevented from being mounted on the mobile device body by moving the projecting portion to the position where the projecting portion does not engage with the engaging portion by the control portion to come into disengagement with the engaging portion when the selection antenna module and the selection circuit module are not matched to each other. According to this structure, when the selection antenna module and the selection circuit module are not matched to each other, at least either the selection antenna module or the selection circuit module is discharged from the mobile device body by the urging member, and hence a combination of the selection antenna module and the selection circuit module not matched to each other can be reliably prevented from being mounted on the mobile device body.

In the aforementioned structure in which the mounting preventing portion includes the urging member, the urging member is preferably a spring member. According to this structure, at least either the selection antenna module or the selection circuit module can be easily discharged from the mobile device body using the spring member having a simple structure when the selection antenna module and the selection circuit module are not matched to each other.

The aforementioned mobile device according to the first aspect preferably further comprises a notification portion notifying that a combination of the selection antenna module and the selection circuit module is not a matching combination when the control portion determines that the selection antenna module and the selection circuit module are not matched to each other. According to this structure, a user can easily recognize that the selection antenna module and the selection circuit module are not matched to each other by notification by the notification portion.

In this case, the notification portion preferably includes a speaker outputting error sound when the selection antenna module and the selection circuit module are not matched to each other. According to this structure, a user can reliably recognize aurally that the selection antenna module and the selection circuit module are not matched to each other.

A radio communication portion of a mobile device according to a second aspect of the present invention comprises a single selection antenna module mountable on a mobile device body, selected from a plurality of antenna modules corresponding to a plurality of radio communication standards, and a single selection circuit module mountable on the mobile device body, selected from a plurality of circuit modules corresponding to a plurality of radio communication standards, wherein the selection circuit module includes a circuit side control portion determining whether or not a combination of the selection antenna module and the selection circuit module is a matching combination in radio communication standards, and controlling radio communication by the selection antenna module and the selection circuit module to be disabled when determining that the selection antenna module and the selection circuit module are not matched to each other and controlling radio communication of a radio communication standard corresponding to the selection antenna module and the selection circuit module to be enabled when determining that the selection antenna module and the selection circuit module are matched to each other. The "radio communication standard(s)" in the present specification indicates a wide concept including not only radio systems such as GSM, 2G, 3G, WiMAX and PHS but also frequencies employed for radio communication.

As hereinabove described, the radio communication portion of a mobile device according to the second aspect of the present invention comprises the single selection antenna module mountable on the mobile device body, selected from the plurality of antenna modules corresponding to the plurality of radio communication standards and the single selection circuit module mountable on the mobile device body, selected from the plurality of circuit modules corresponding to the plurality of radio communication standards, whereby a module including an antenna mounted on the mobile device body decreases in size, and hence flexibility of arrangement of the antenna modules with respect to the mobile device body can be improved as compared with a case where the selection circuit module and the selection antenna module are integrated with each other. Thus, the antenna modules can be easily arranged in a position where receiving sensitivity is excellent, and hence excellent communication characteristics can be obtained. The selection circuit module matched to the selection antenna module is selected from the plurality of circuit modules to be mounted on the mobile device body, whereby the mobile device body may not be loaded with the plurality of circuit modules corresponding to the plurality of antenna modules beforehand. Thus, the mobile device body can be inhibited from increasing in size. Therefore, excellent communication characteristics can be obtained by improving flexibility of arrangement of the antenna modules with respect to the mobile device body while the mobile device body is inhibited from increasing in size by employing the radio communication portion of a mobile device according to the second aspect. Further, the circuit side control portion determining whether or not a combination of the selection antenna module and the selection circuit module is a matching combination in the radio communication standards, and controlling radio communication by the selection antenna module and the selection circuit module to be disabled when determining that the selection antenna module and the selection circuit module are not matched to each other and controlling radio communication of the radio communication standard corresponding to the selection antenna module and the selection circuit module to be enabled when determining that the selection antenna module and the selection circuit module are matched to each other is provided in the selection circuit module, whereby the circuit side control portion can prevent a combination of the selection antenna module and the selection circuit module not matched to each other from performing radio communication also when the antenna modules and the circuit modules are separated from each other to be capable of being individually mounted on the mobile device body. Thus, violation of laws and regulations can be prevented and a problem with communication caused by the selection antenna module and the selection circuit module not matched to each other can be prevented from occurrence (prescribed communication performance can be prevented from being unsatisfied and a damage of the selection circuit module caused by a reflected wave from the selection antenna module not matched to the selection circuit module can be prevented from occurrence, for example).

In the aforementioned radio communication portion of a mobile device according to the second aspect, the circuit side control portion is preferably formed to acquire information or characteristics for determining whether or not the selection antenna module and the selection circuit module are matched to each other from the selection antenna module and determine whether or not the selection antenna module and the selection circuit module are matched to each other on the basis of the acquired information or characteristics. According to this structure, the circuit side control portion can easily determines whether or not the selection antenna module and the selection circuit module are matched to each other using the information or characteristics for determining whether or not the selection antenna module and the selection circuit module are matched to each other.

In the aforementioned radio communication portion of a mobile device according to the second aspect, the selection antenna module and the selection circuit module are preferably formed to transmit a high-frequency signal to each other without contact when the selection antenna module and the selection circuit module are matched to each other. According to this structure, a high-frequency signal can be easily transmitted between the selection antenna module and the selection circuit module provided separately from each other without using a cable or the like and without contact therebetween.

In the aforementioned structure in which the circuit side control portion acquires the information for determining whether or not the selection antenna module and the selection circuit module are matched to each other from the selection antenna module, the circuit side control portion is preferably formed to acquire first identification information provided peculiarly with respect to the selection antenna module and determine whether or not the selection antenna module and the selection circuit module are matched to each other on the basis of the acquired first identification information. According to this structure, it is not necessary to acquire the characteristics using a measuring instrument or the like, and whether or not the selection antenna module and the selection circuit module are matched to each other can be determined on the basis of the peculiar first identification information provided beforehand to the selection antenna module.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

First, the structure of a mobile phone 100 according to a first embodiment of the present invention is described with reference to FIGS. 1 to 6. The mobile phone 100 is an example of the "mobile device" in the present invention.

Figure 1:
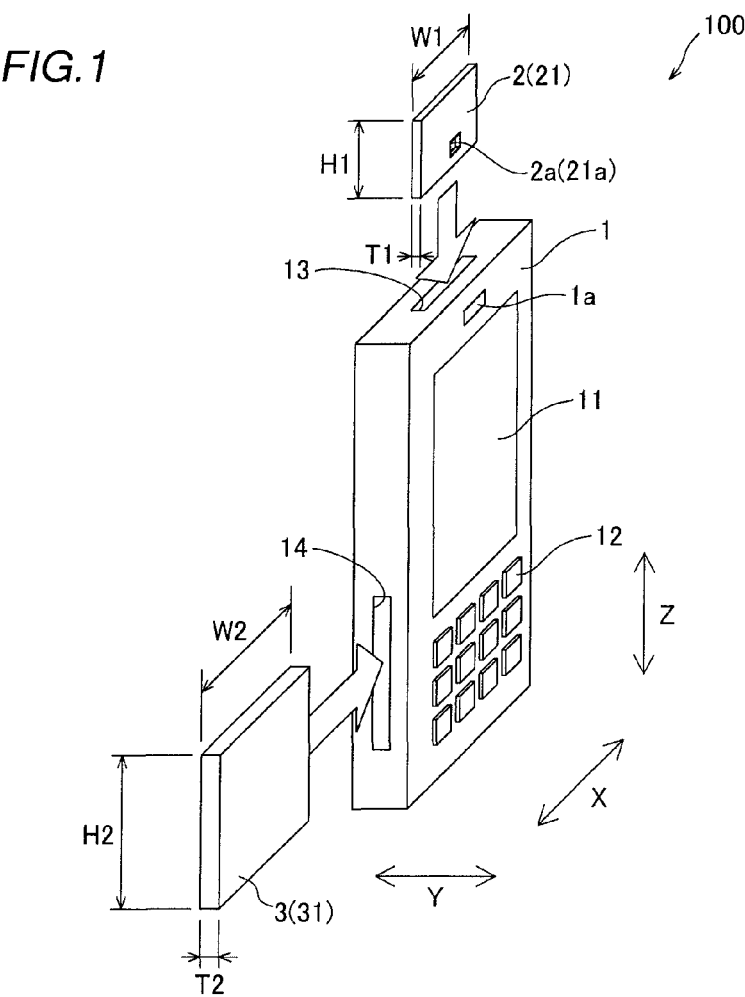
FIG. 1 is a perspective view showing the overall structure of a mobile phone according to a first embodiment of the present invention.

The mobile phone 100 according to the first embodiment of the present invention comprises a mobile device body 1, a single selection antenna module 21 selected from a plurality of antenna modules 2 corresponding to a plurality of radio systems (an example of a radio communication standard) (GSM, 3G and WiMAX, for example) and a single selection circuit module 31 selected from a plurality of circuit modules 3 corresponding to a plurality of radio systems (GSM, 3G and WiMAX, for example), as shown in FIG. 1. According to the first embodiment, the antenna modules 2 and the circuit modules 3 are individually provided with respect to each of radio systems. A combination of the selection antenna module 21 and the selection circuit module 31 matched to each other in the radio systems is mounted on the mobile device body 1, whereby the mobile phone 100 is capable of radio communication of a radio system corresponding to the combination. According to the first embodiment, each of the antenna modules 2 and each of the circuit modules 3 are so formed as to correspond to one of the radio systems. A radio communication portion constituted by the selection antenna module 21 and the selection circuit module 31 is an example of the "radio communication portion of a mobile device" in the present invention.

Figure 2:
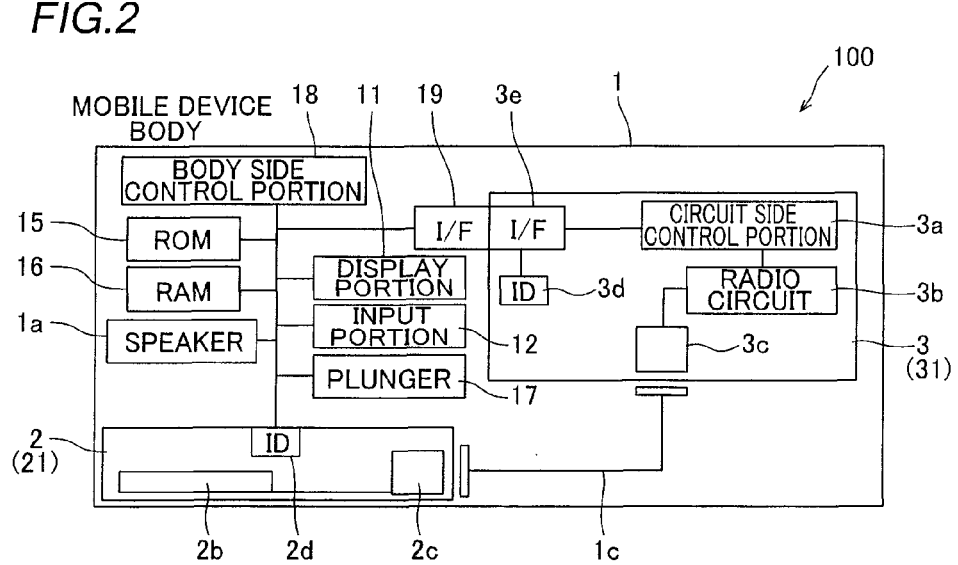
FIG. 2 is a block diagram showing the overall structure of the mobile phone according to the first embodiment of the present invention.

The mobile device body 1 has a display portion 11 constituted by a liquid crystal display, provided on a front surface thereof, an input portion 12 constituted by a plurality of buttons, provided on the front surface thereof, a receiving portion 13 receiving the selection antenna module 21, provided on an upper surface thereof and a receiving portion 14 receiving the selection circuit module 31, provided on a side surface thereof, as shown in FIG. 1. A ROM 15, a RAM 16, a plunger 17 and a body side control portion 18 controlling each part of the mobile device body 1 are provided in the mobile device body 1, as shown in FIG. 2. Further, the mobile device body 1 has a compression spring 1b urging the selection antenna module 21 inserted into the mobile device body 1 in a direction (upward direction) opposite to an insertion direction (downward direction), as shown in FIG. 4.

The ROM 15 stores a processing program for executing various functions such as a telephone function, an e-mail function, an Internet function and so on. Further, the ROM 15 stores a bit position table for the body side control portion 18 to determine whether or not the selection antenna module 21 and the selection circuit module 31 are matched to each other. As shown in FIG. 3, the bit position table corresponds to 16 bits, and each bit position and each radio system are associated with each other.

The RAM 16 is employed to readout the processing program stored in the ROM 15. Further, the RAM 16 is employed as a work area of the body side control portion 18 at the execution of the processing program.

Figures 3, 4, 5:
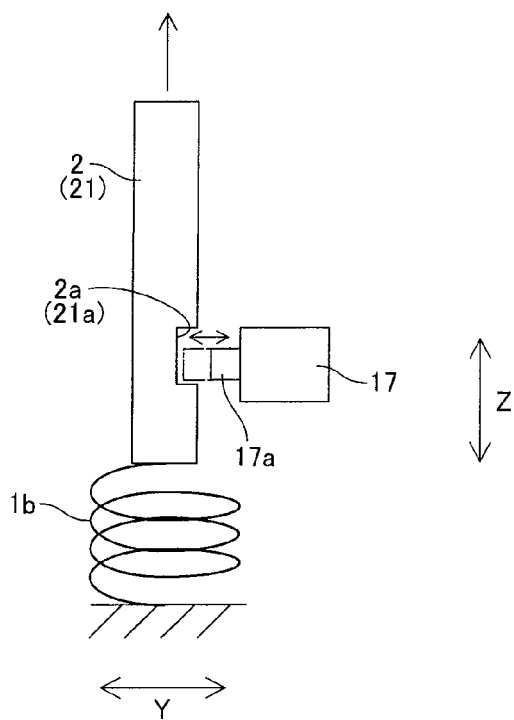
FIG. 3 illustrates a bit position table of the mobile phone according the first embodiment of the present invention.
FIG. 4 is a diagram for illustrating a state where mounting of a selection antenna module of the mobile phone according the first embodiment of the present invention is released.
FIG. 5 is a diagram for illustrating identification information of one of antenna modules of the mobile phone according to the first embodiment of the present invention.

The plunger 17 is formed such that a projecting portion 17a moves linearly in a direction Y by a piston mechanism, as shown in FIG. 4. Specifically, the projecting portion 17a moves in the direction Y thereby coming into engagement or disengagement with a recess portion 21a, described later, of the selection antenna module 21 inserted into the mobile device body 1. Thus, the selection antenna module 21 resists urging force in a direction in which the selection antenna module 21 is pushed out of the mobile device body 1 (upward direction), generated by the compression spring 1b and is mounted on the mobile device body 1 when the projecting portion 17a and the recess portion 21a come into engagement with each other. Mounting of the selection antenna module 21 on the mobile device body 1 is released by being pushed out of the mobile device body 1 by the compression spring 1b, on the other hand, when the projecting portion 17a and the recess portion 21a come into disengagement with each other. The compression spring 1b and the plunger 17 are examples of the "mounting preventing portion" in the present invention.

The body side control portion 18 is provided to execute the processing program stored in the ROM 15 and loaded by the RAM 16. The body side control portion 18 can communicate with the selection circuit module 31 mounted on the mobile device body 1 through an interface 19. The body side control portion 18 executes matching determination processing when both the selection antenna module 21 and the selection circuit module 31 are inserted into the mobile device body 1, as described later. The body side control portion 18 controls each part to output an error sound from a speaker 1a (see FIGS. 1 and 2) when the selection antenna module 21 and the selection circuit module 31 are not matched to each other. The speaker 1a and the body side control portion 18 are examples of the "notification portion" in the present invention.

Each of the antenna modules 2 (selection antenna module 21) has a height H1 of about 10 mm, a width W1 of about 25 mm and a thickness T1 of about 1 mm, and each of the antenna modules 2 is formed to be smaller than each of the circuit modules 3 (selection circuit module 31) as described later. Each of the antenna modules 2 (selection antenna module 21) has a recess portion 2a (21a) formed in a rectangular shape on a front surface thereof. The recess portion 2a (21a) is arranged at a position opposed to the projecting portion 17a of the plunger 17 in a state of inserting one of the antenna modules 2 (selection antenna module 21) into the mobile device body 1.

As shown in FIG. 2, an antenna element 2b for radio waves and a coupling terminal 2c for electrostatic coupling enabling transmission of a high-frequency signal are provided in each of the antenna modules 2 (selection antenna module 21). The ROM 2d is an example of the "first storage portion" in the present invention.

The coupling terminal 2c is connected to the antenna element 2b. The coupling terminal 2c can be connected to a coupling terminal 3c, described later, of the selection circuit module 31 through a cable 1c provided in the mobile device body 1 through electrostatic coupling when both the selection antenna module 21 and the selection circuit module 31 are mounted on the mobile device body 1. Thus, when both the selection antenna module 21 and the selection circuit module 31 are mounted on the mobile device body 1, a high-frequency signal can be transmitted without contact between the selection antenna module 21 and the selection circuit module 31.

The ROM 2d stores ID information indicating which of the radio systems each of the antenna modules 2 (selection antenna module 21) corresponds to, provided peculiarly with respect to each of the antenna modules 2 (selection antenna module 21). Specifically, the ID information of each of the antenna modules 2 (selection antenna module 21) is constituted by 16 bits, and "1" is set at a bit position corresponding to a radio system capable of corresponding to a combination of the selection antenna module and the selection circuit module. In a case of one of the antenna modules 2 (selection antenna module 21) corresponding to 3G, as shown in FIG. 5, "1" is set at a third bit position, for example. In a case of one of the antenna modules 2 (selection antenna module 21) corresponding to GSM, "1" is set at a zeroth bit position. Thus, the body side control portion 18 can recognize which of the radio systems each of the antenna modules 2 (selection antenna module 21) corresponds to on the basis of the bit position table (see FIG. 3) stored in the ROM 15 and acquired ID information. The ID information of each of the antenna modules 2 (selection antenna module 21) is an example of the "first identification information" in the present invention.

Each of the circuit modules 3 (selection circuit module 31) has a height H2 of about 30 mm, a width W2 of about 30 mm and a thickness T2 of about 3 mm and is larger than each of the antenna modules 2 (selection antenna module 21). This is because each of the antenna modules 2 (selection antenna module 21) only includes components, which are easily downsized, such as the antenna element 2b and the coupling terminal 2c whereas each of the circuit modules 3 (selection circuit module 31) includes components, which are not easily downsized, such as a circuit side control portion 3a and a radio circuit 3b, as described later.

The circuit side control portion 3a, the radio circuit 3b, the coupling terminal 3c for electrostatic coupling enabling transmission of a high-frequency signal and the ROM 3d are provided in each of the circuit modules 3 (selection circuit module 31) as shown in FIG. 2. The ROM 3d is an example of the "second storage portion" in the present invention.

The circuit side control portion 3a is connected to the mobile device body 1 to be capable of communicating therewith through an interface 3e when mounting the selection circuit module 31 on the mobile device body 1. Further, the circuit side control portion 3a is connected to the radio circuit 3b and can communicate with the radio circuit 3b. Thus, the circuit side control portion 3a can transmit an instruction from the mobile device body 1 to the radio circuit 3b and transmit a signal from the radio circuit 3b to the mobile device body 1.

The radio circuit 3b can transmit and receive various signals (sound signals and picture signals, for example) through the antenna element 2b of the selection antenna module 21.

The coupling terminal 3c is connected to the radio circuit 3b. When mounting both the selection antenna module 21 and the selection circuit module 31 on the mobile device body 1, the coupling terminal 3c can be electrostatically coupled to the coupling terminal 2c of the selection antenna module 21. The selection antenna module 21 and the selection circuit module 31 can be electrostatically coupled to each other by using this cable 1c also when a distance between the selection antenna module 21 and the selection circuit module 31 after mounting is large. Thus, flexibility of arrangement of the selection antenna module 21 can be further improved.

The ROM 3d stores ID information indicating which of the radio systems each of the circuit modules 3 (selection circuit module 31) corresponds to, provided peculiarly with respect to each of the circuit modules 3 (selection circuit module 31). Specifically, the ID information of each of the circuit modules 3 (selection circuit module 31) is constituted by 16 bits similarly to the ID information of each of the antenna modules 2 (selection antenna module 21), and "1" is set at a bit position corresponding to a radio system capable of corresponding to a combination of the selection antenna module and the selection circuit module. Thus, the body side control portion 18 can recognize which of the radio systems each of the circuit modules 3 (selection circuit module 31) corresponds to on the basis of the bit position table (see FIG. 3) stored in the ROM 15 and acquired ID information. The ID information of each of the circuit modules 3 (selection circuit module 31) is an example of the "second identification information" in the present invention.

Figure 6:
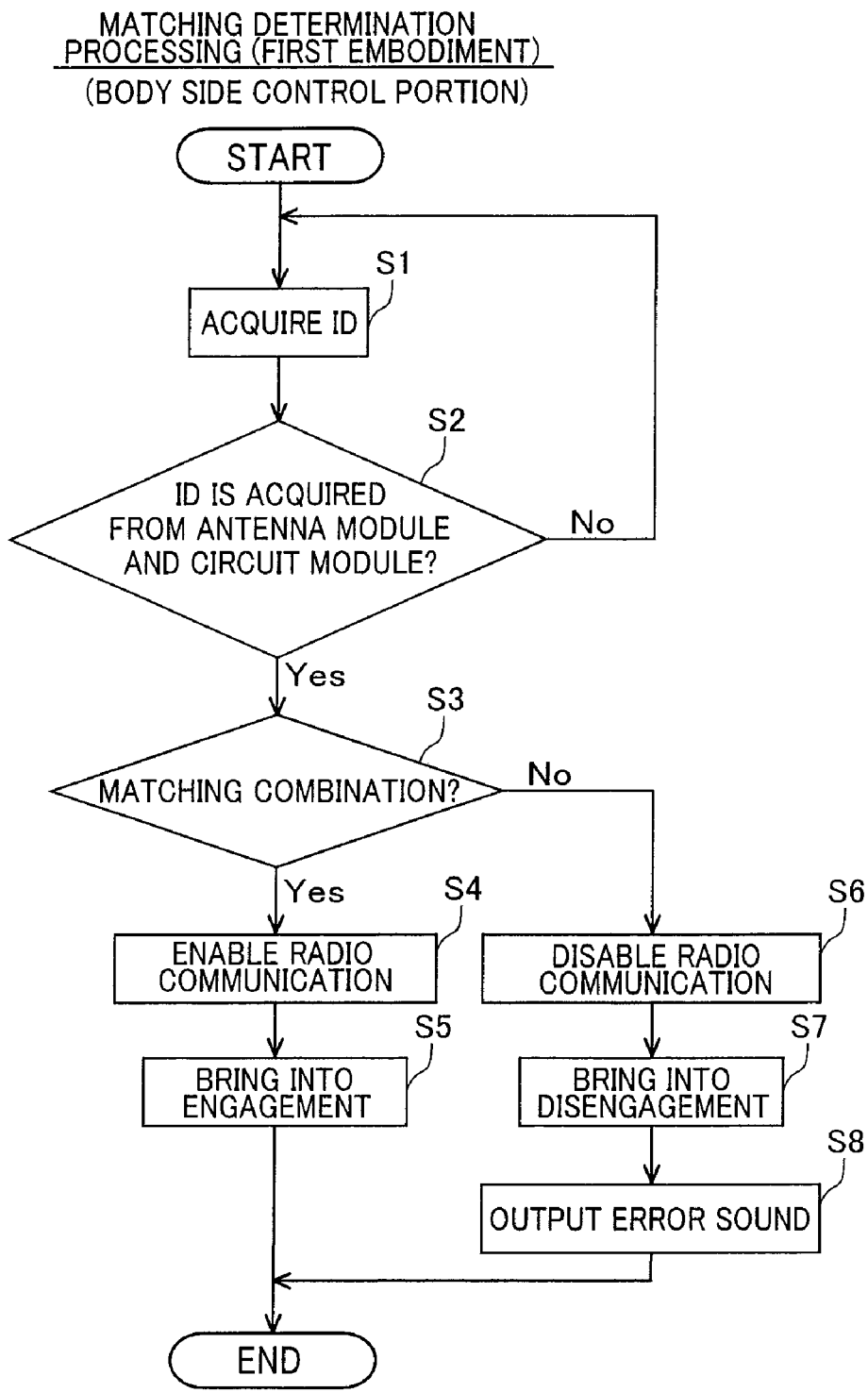
FIG. 6 is a flow chart for illustrating matching determination processing of the mobile phone according to the first embodiment of the present invention.

The matching determination processing executed by the body side control portion 18 of the mobile phone 100 according to the first embodiment is now described with reference to FIG. 6.

When inserting both the selection antenna module 21 and the selection circuit module 31 into the mobile device body 1, the matching determination processing is executed by the body side control portion 18. The body side control portion 18 acquires the ID information from the ROM 2d of the selection antenna module 21 and also from the ROM 3d of the selection circuit module 31 at a step S1. The body side control portion 18 determines whether or not the ID information has been acquired from both the selection antenna module 21 and the selection circuit module 31 at a step S2, and the steps S1 and S2 are repeated until the ID information is acquired from both. After acquiring the ID information from both the selection antenna module 21 and the selection circuit module 31, the body side control portion 18 determines whether or not a combination of the selection antenna module 21 and the selection circuit module 31 is a matching combination in the radio systems on the basis of the acquired two types of ID information at a step S3. Specifically, the body side control portion 18 recognizes which of the radio systems each of the selection antenna module 21 and the selection circuit module 31 corresponds to and determines whether or not the selection antenna module 21 and the selection circuit module 31 are matched to each other on the basis of the bit position table (see FIG. 3) of the ROM 15 and the acquired ID information.

When the selection antenna module 21 and the selection circuit module 31 are matched to each other, the body side control portion 18 enables radio communication of a radio system corresponding to the mounted selection antenna module 21 and the mounted selection circuit module 31 at a step S4. Specifically, the body side control portion 18 starts transmitting and receiving various signals (sound signals and picture signals, for example) between the body side control portion 18 and the selection circuit module 31 through the interface 19. Thus, radio communication with the selection circuit module 31 and the selection antenna module 21 starts.

The body side control portion 18 moves the projecting portion 17a of the plunger 17 to a position where the projecting portion 17a engages with the recess portion 21a so that the recess portion 21a of the selection antenna module 21 and the projecting portion 17a of the plunger 17 come into engagement with each other at a step S5. Specifically, the projecting portion 17a of the plunger 17 is moved toward the selection antenna module 21 by the body side control portion 18, whereby the recess portion 21a of the selection antenna module 21 and the projecting portion 17a of the plunger 17 are engaged with each other. Thus, the selection antenna module 21 resists urging force in the upward direction generated by the compression spring 1b and is mounted on the mobile device body 1.

When the selection antenna module 21 and the selection circuit module 31 are not matched to each other, on the other hand, the body side control portion 18 disables radio communication by the mounted selection antenna module 21 and the mounted selection circuit module 31 at a step S6. Specifically, the body side control portion 18 stops transmitting and receiving various signals (sound signals and picture signals, for example) between the body side control portion 18 and the selection circuit module 31. Thus, radio communication with the selection circuit module 31 and the selection antenna module 21 stops.

The body side control portion 18 moves the projecting portion 17*a* of the plunger 17 to a position where the projecting portion 17*a* does not engage with the recess portion 21*a* so that the recess portion 21*a* of the selection antenna module 21 and the projecting portion 17*a* of the plunger 17 come into disengagement with each other at a step S7. Specifically, the projecting portion 17*a* of the plunger 17 is moved to separate from the selection antenna module 21 by the body side control portion 18, whereby the recess portion 21*a* of the selection antenna module 21 and the projecting portion 17*a* of the plunger 17 are not engaged with each other. Thus, the selection antenna module 21 cannot resist the urging force in the upward direction generated by the compression spring 1*b* and is pushed out of the mobile device body 1, so that mounting of the selection antenna module 21 on the mobile device body 1 is released. Thereafter, the body side control portion 18 outputs the error sound from the speaker 1*a* at a step S8.

According to the first embodiment, as hereinabove described, the mobile phone 100 comprises the single selection antenna module 21 mountable on the mobile device body 1, selected from the plurality of antenna modules 2 corresponding to the plurality of radio systems (an example of a radio communication standard) and the single selection circuit module 31 mountable on the mobile device body 1, selected from the plurality of circuit modules 3 corresponding to the plurality of radio systems, whereby a module including an antenna mounted on the mobile device body 1 decreases in size, and hence flexibility of arrangement of the antenna modules 2 with respect to the mobile phone body 1 can be improved as compared with a case where the selection circuit module 31 and the selection antenna module 21 are integrated with each other. Thus, the antenna modules 2 can be easily arranged in a position where receiving sensitivity is excellent, and hence excellent communication characteristics can be obtained. The selection circuit module 31 matched to the selection antenna module 21 is selected from the plurality of circuit modules 3 to be mounted on the mobile device body 1, whereby the mobile device body 1 may not be loaded with the plurality of circuit modules 3 corresponding to the plurality of antenna modules 2 beforehand. Thus, the mobile device body 1 can be inhibited from increasing in size. Therefore, excellent communication characteristics can be obtained by improving flexibility of arrangement of the antenna modules 2 with respect to the mobile phone body 1 while the mobile device body 1 is inhibited from increasing in size.

According to the first embodiment, the body side control portion 18 determining whether or not a combination of the selection antenna module 21 and the selection circuit module 31 is a matching combination in the radio systems is provided, and the body side control portion 18 is formed to control radio communication by the selection antenna module 21 and the selection circuit module 31 to be disabled when determining that the selection antenna module 21 and the selection circuit module 31 are not matched to each other and control radio communication of a radio system corresponding to the selection antenna module 21 and the selection circuit module 31 to be enabled when determining that the selection antenna module 21 and the selection circuit module 31 are matched to each other, whereby the body side control portion 18 can prevent a combination of the selection antenna module 21 and the selection circuit module 31 not matched to each other from performing radio communication also when the antenna modules 2 and the circuit modules 3 are separated from each other to be capable of being individually mounted on the mobile device body 1. Thus, violation of laws and regulations can be prevented and a problem with communication caused by the selection antenna module 21 and the selection circuit module 31 not matched to each other can be prevented from occurrence (prescribed communication performance can be prevented from being unsatisfied and a damage of the selection circuit module 31 caused by a reflected wave from the selection antenna module 21 not matched to the selection circuit module 31 can be prevented from occurrence, for example).

According to the first embodiment, the body side control portion 18 is formed to stop radio communication by the mobile device body 1 when the selection antenna module 21 and the selection circuit module 31 are not matched to each other, whereby violation of laws and regulations can be reliably prevented and a problem with communication caused by the selection antenna module 21 and the selection circuit module 31 not matched to each other can be reliably prevented from occurrence (prescribed communication performance can be reliably prevented from being unsatisfied and a damage of the selection circuit module 31 caused by a reflected wave from the selection antenna module 21 not matched to the selection circuit module 31 can be reliably prevented from occurrence, for example).

According to the first embodiment, the plunger 17 and the compression spring 1*b* releasing mounting of the selection antenna module 21 on the mobile device body 1 are provided, and the plunger 17 is controlled to release mounting of the selection antenna module 21 on the mobile device body 1 by the body side control portion 18 when the selection antenna module 21 and the selection circuit module 31 are not matched to each other, whereby the selection antenna module 21 is not mounted on the mobile device body 1 when the selection antenna module 21 and the selection circuit module 31 are not matched to each other. Thus, radio communication can be reliably prevented from being performed by the selection antenna module 21 and the selection circuit module 31 not matched to each other.

According to the first embodiment, the speaker 1*a* notifying that a combination of the selection antenna module 21 and the selection circuit module 31 is not a matching combination when determining that the selection antenna module 21 and the selection circuit module 31 are not matched to each other is provided, whereby a user can easily recognize that the selection antenna module 21 and the selection circuit module 31 are not matched to each other.

According to the first embodiment, the selection antenna module 21 and the selection circuit module 31 are formed to transmit a high-frequency signal without contact therebetween when the selection antenna module 21 and the selection circuit module 31 are matched to each other, whereby a high-frequency signal can be easily transmitted between the selection antenna module 21 and the selection circuit module 31 provided separately from each other without using a cable or the like and without contact therebetween.

According to the first embodiment, the projecting portion 17*a* capable of moving to a position where the projecting portion 17*a* engages or does not engage with the recess portion 21*a* provided on the selection antenna module 21 and the compression spring 1*b* urging the selection antenna module 21 in a discharging direction from the mobile device body 1 are provided, and the selection antenna module 21 is formed to be moved in the discharging direction from the mobile device body 1 by urging force generated by the compression spring 1b and be prevented from being mounted on the mobile device body 1 by moving the projecting portion 17a to a position where the projecting portion 17a does not engage with the recess portion 21a by the body side control portion 18 to come into disengagement with the recess portion 21a when the selection antenna module 21 and the selection circuit module 31 are not matched to each other, whereby when the selection antenna module 21 and the selection circuit module 31 are not matched to each other, the selection antenna module 21 is discharged from the mobile device body 1 by the compression spring 1b, and hence a combination of the selection antenna module 21 and the selection circuit module 31 not matched to each other can be reliably prevented from being mounted on the mobile device body 1.

According to the first embodiment, the speaker 1a outputting the error sound when the selection antenna module 21 and the selection circuit module 31 are not matched to each other is provided, whereby a user can reliably recognize aurally that the selection antenna module 21 and the selection circuit module 31 are not matched to each other.

(Second Embodiment)

Next, a mobile phone 200 according to a second embodiment of the present invention is described with reference to FIGS. 7 to 10. According to the second embodiment, peculiar identification information of each of antenna modules 202 (selection antenna module 221) is acquired on the basis of arrangement of a projecting portion 202e provided on each of the antenna modules 202 (selection antenna module 221), and peculiar identification information of each of circuit modules 203 (selection circuit module 231) is acquired on the basis of arrangement of a projecting portion 203f provided on each of the circuit modules 203 (selection circuit module 231), dissimilarly to the aforementioned first embodiment. The mobile phone 200 is an example of the "mobile device" in the present invention. The projecting portion 202e is an example of the "first concavo-convex portion" in the present invention, and the projecting portion 203f is an example of the "second concavo-convex portion" in the present invention.

Figure 7:
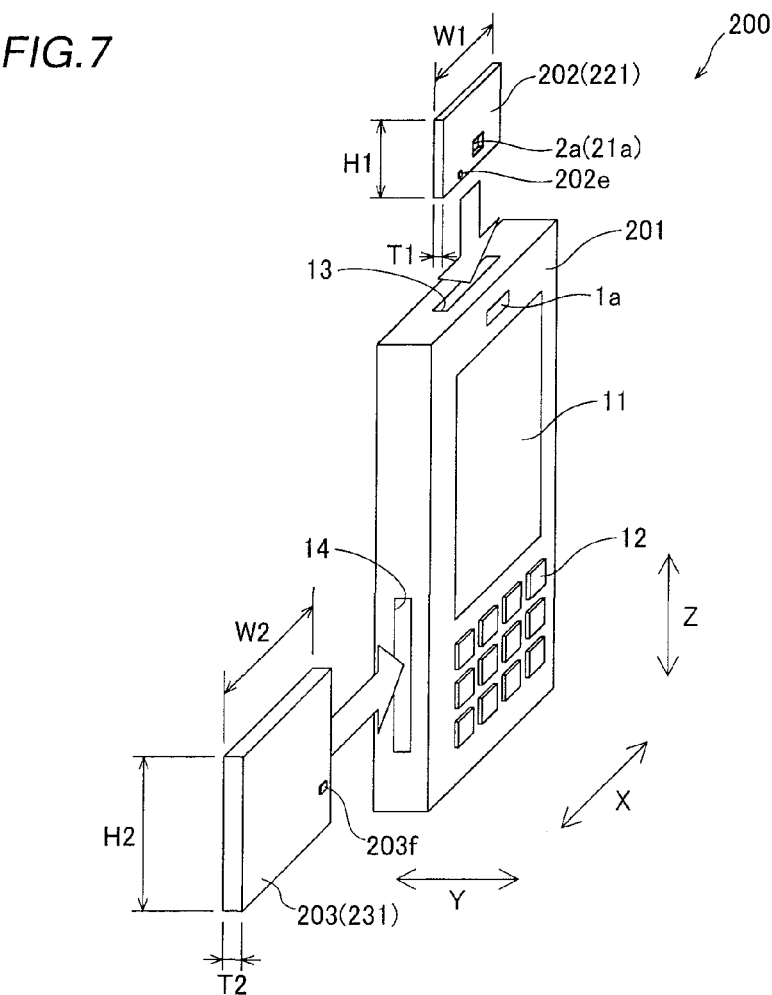
FIG. 7 is a perspective view showing the overall structure of a mobile phone according to a second embodiment of the present invention.

The mobile phone 200 according to the second embodiment comprises a mobile device body 201, the single selection antenna module 221 selected from a plurality of the antenna modules 202 corresponding to a plurality of radio systems (an example of a radio communication standard) (GSM, 3G and WiMAX, for example) and the single selection circuit module 231 selected from a plurality of the circuit modules 203 corresponding to a plurality of radio systems (GSM, 3G and WiMAX, for example) as shown in FIG. 7. The mobile phone 200 is mounted with a combination of the selection antenna module 221 and the selection circuit module 231 matched to each other in the radio systems, thereby enabling radio communication of a radio system corresponding to the combination. The selection antenna module 221 and the selection circuit module 231 constitute the "radio communication portion of a mobile device" in the present invention.

Figure 8:
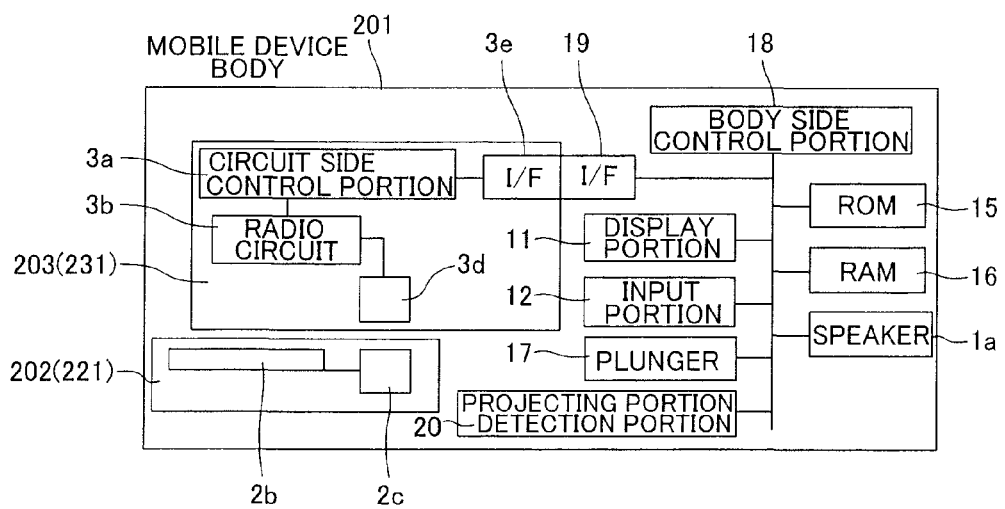
FIG. 8 is a block diagram showing the overall structure of the mobile phone according to the second embodiment of the present invention.

In addition to a speaker 1a, a ROM 15, a RAM 16, a plunger 17, a body side control portion 18 and an interface 19, a projecting portion detection portion 20 is provided in the mobile device body 201, as shown in FIG. 8.

According to the second embodiment, the body side control portion 18 is formed to acquire the peculiar identification information of the selection antenna module 221 on the basis of arrangement of the projecting portion 202e, described later, provided on the selection antenna module 221. Further, the body side control portion 18 is formed to acquire the peculiar identification information of the selection circuit module 231 on the basis of arrangement of the projecting portion 203f, described later, provided on the selection circuit module 231.

Figure 9:
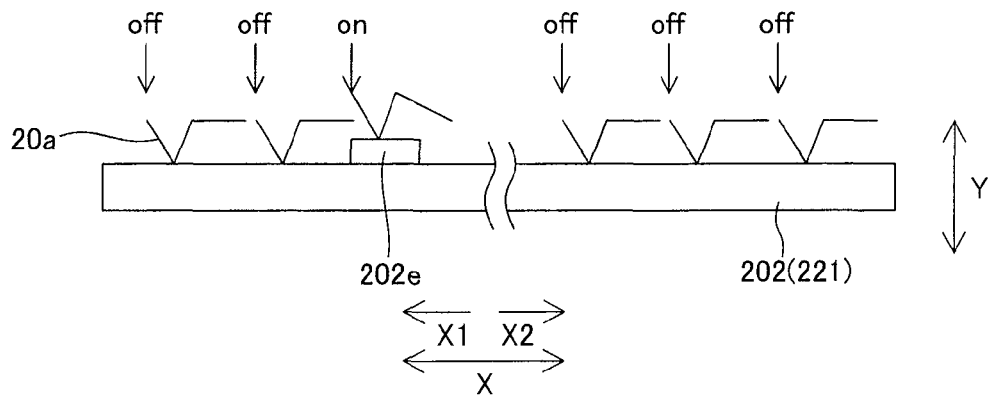
FIG. 9 illustrates a projecting portion of one of antenna modules of the mobile phone according to the second embodiment of the present invention.

The projecting portion detection portion 20 has a function of detecting the projecting portion 202e of the selection antenna module 221 and the projecting portion 203f of the selection circuit module 231. Specifically, the projecting portion detection portion 20 has sixteen switches 20a made of a conductive material, capable of being in contact with the projecting portion 202e provided on the selection antenna module 221 mounted on the mobile device body 201 as shown in FIG. 9. Thus, one of the switches 20a corresponding to a position of the projecting portion 202e provided on the selection antenna module 221 is moved by the projecting portion 202e to be turned on. The projecting portion detection portion 20 has sixteen switches (not shown) formed similarly to the switches 20a of the selection antenna module 221.

Figure 10:
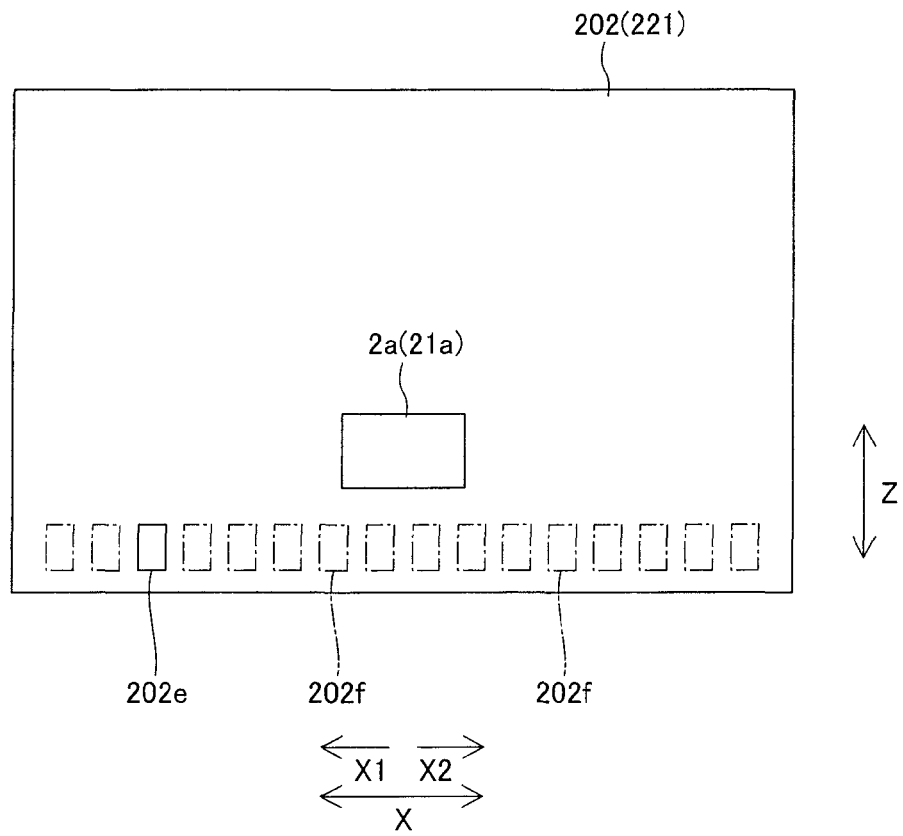
FIG. 10 is a plan view for illustrating the projecting portion of one of the antenna modules of the mobile phone according to the second embodiment of the present invention.

Each of the antenna modules 202 (selection antenna module 221) has the projecting portion 202e in the vicinity of a lower end of a front surface thereof as shown in FIG. 7. Specifically, sixteen arrangement regions 202f for arranging the projecting portion 202e in the vicinity of the lower end are provided to be adjacent to each other in a direction X (width direction) on the front surface of each of the antenna modules 202 (selection antenna module 221), as shown in FIG. 10. The sixteen arrangement regions 202f correspond to a bit position table (see FIG. 3) stored in the ROM 15. Specifically, each of the arrangement regions 202f corresponds to a zeroth bit position, a first bit position, ... successively from an end in a direction X1, and one of the arrangement regions 202f on an end in a direction X2 corresponds to a fifteen bit position. The projecting portion 202e of each of the antenna modules 202 (selection antenna module 221) is formed at a bit position corresponding to a radio system capable of corresponding to a combination of the selection antenna module and the selection circuit module. In a case of one of the antenna modules 202 (selection antenna module 221) corresponding to a radio system of 2G, for example, the projecting portion 202e is arranged at a second bit position, which is the third from the end in the direction X1, as shown in FIG. 10. Thus, one of the switches 20a of the projecting portion detection portion 20 corresponding to a position of the projecting portion 202e is turned on when the selection antenna module 221 is mounted on the mobile device body 201, whereby a radio system capable of corresponding to the selection antenna module 221 is recognized on the basis of the bit position table by the body side control portion 18. In other words, according to the second embodiment, peculiar identification information for matching determination of the selection antenna module 221 is acquired on the basis of arrangement of the projecting portion 202e of the selection antenna module 221 by the body side control portion 18.

Figure 11:
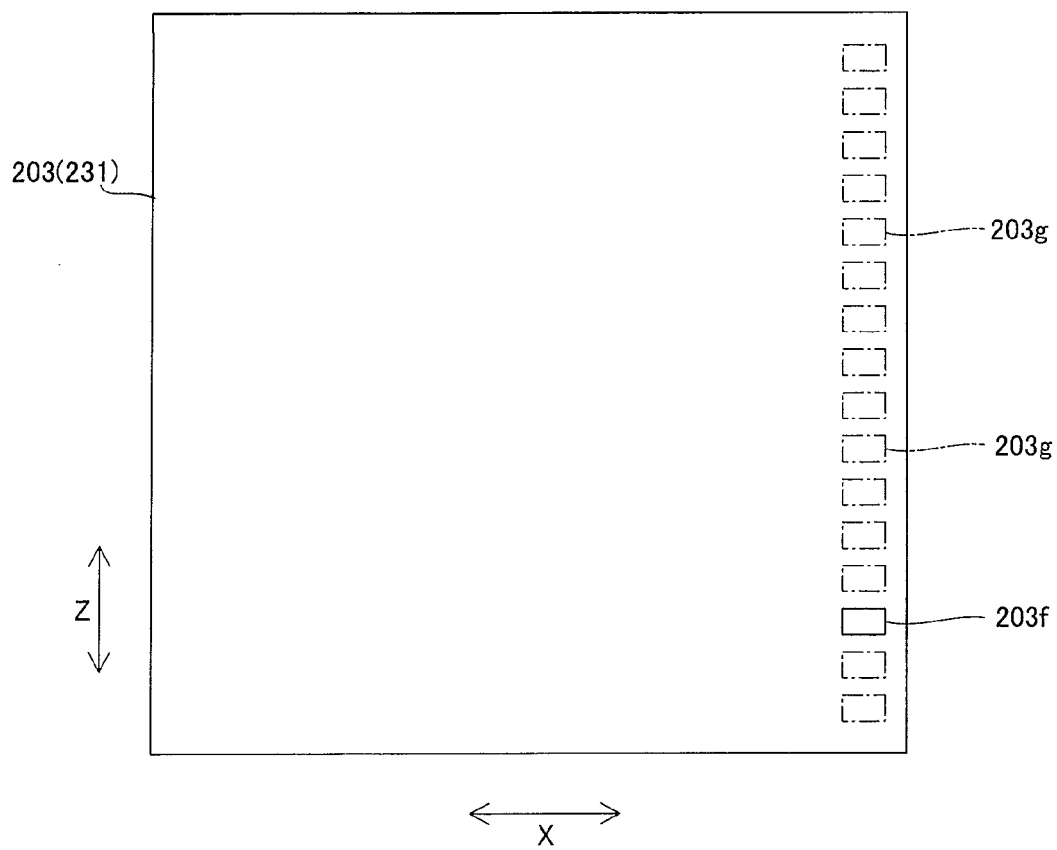
FIG. 11 is a plan view for illustrating the projecting portion of one of circuit modules of the mobile phone according to the second embodiment of the present invention.

Each of the circuit modules 203 (selection circuit module 231) has the projecting portion 203f in the vicinity of an end in an insertion direction of a front surface thereof as shown in FIG. 7. Specifically, sixteen arrangement regions 203g for arranging the projecting portion 203f in the vicinity of the end in the insertion direction are provided to be adjacent to each other in a direction Z (vertically) on the front surface of each of the circuit modules 203 (selection circuit module 231) similarly to each of the antenna modules 202 (selection antenna module 221), as shown in FIG. 11. These sixteen arrangement regions 203g correspond to the bit position table (see FIG. 3) stored in the ROM 15. Specifically, each of the arrangement regions 203g corresponds to the zeroth bit position, the first bit position, ... successively from a lower end, and one of the arrangement regions 203g on an upper end corresponds to the fifteen bit position. The projecting portion 203f of each of the circuit modules 203 (selection circuit module 231) is formed at a bit position corresponding to a radio system capable of corresponding to a combination of the selection antenna module and the selection circuit module. Thus, one of the switches of the projecting portion detection portion 20 corresponding to a position of the projecting portion 203f is turned on when the selection circuit module 231 is mounted on the mobile device body 201, whereby a radio system capable of corresponding to the selection circuit module 231 is recognized on the basis of the bit position table by the body side control portion 18. In other words, peculiar identification information for matching determination of the selection circuit module 231 is acquired on the basis of arrangement of the projecting portion 203f of the selection circuit module 231 by the body side control portion 18.

A coupling terminal 2c of the selection antenna module 221 and a coupling terminal 3c of the selection circuit module 231 are arranged at positions opposed to each other at a prescribed interval when both the selection antenna module 221 and the selection circuit module 231 are mounted on the mobile device body 201, as shown in FIG. 8. Thus, the coupling terminal 2c and the coupling terminal 3c can be directly connected to each other through electrostatic coupling without the need for a cable 1c, similarly to the aforementioned first embodiment.

The remaining structure of the second embodiment is similar to that of the aforementioned first embodiment.

According to the second embodiment, as hereinabove described, the projecting portions 202e and 203f are provided on the selection antenna module 221 and the selection circuit module 231, respectively and the body side control portion 18 is formed to acquire the identification information provided peculiarly with respect to each of the selection antenna module 221 and the selection circuit module 231 on the basis of arrangement of the projecting portions 202e and 203f, whereby no storage portion constituted by a ROM or the like for storing the identification information may be provided in each of the selection antenna module 221 and the selection circuit module 231, and the identification information of each of the selection antenna module 221 and the selection circuit module 231 can be acquired.

The remaining effects of the second embodiment are similar to those of the aforementioned first embodiment.

(Third Embodiment)

Next, a mobile phone 300 according to a third embodiment of the present invention is described with reference to FIGS. 12 and 13. According to the third embodiment, a circuit side control portion 303a of a selection circuit module 331 determines whether or not a selection antenna module 321 and the selection circuit module 331 are matched to each other, dissimilarly to the aforementioned first embodiment. The mobile phone 300 is an example of the "mobile device" in the present invention.

Figure 12:
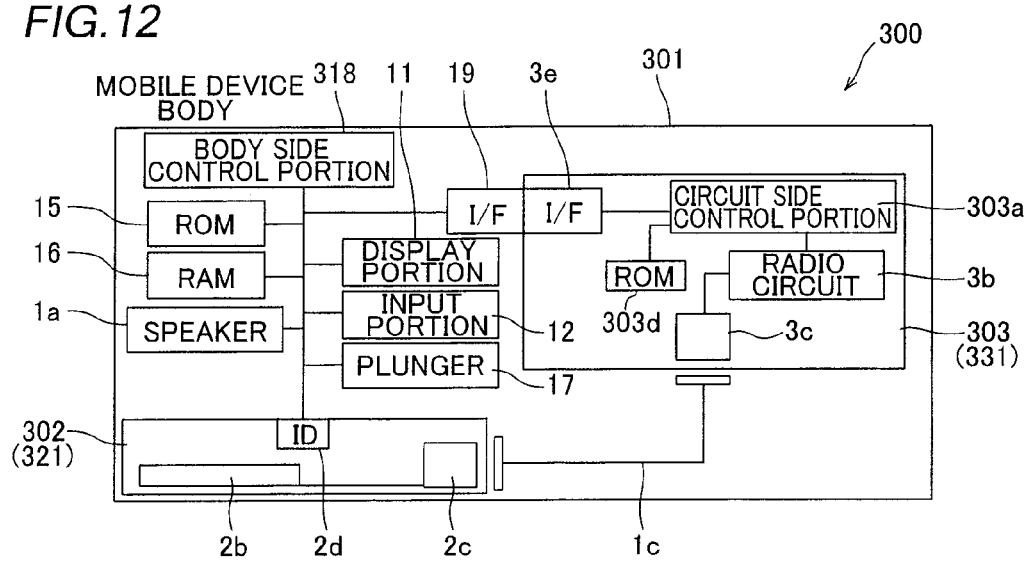
FIG. 12 is a block diagram showing the overall structure of a mobile phone according to a third embodiment of the present invention.
Figure 13:
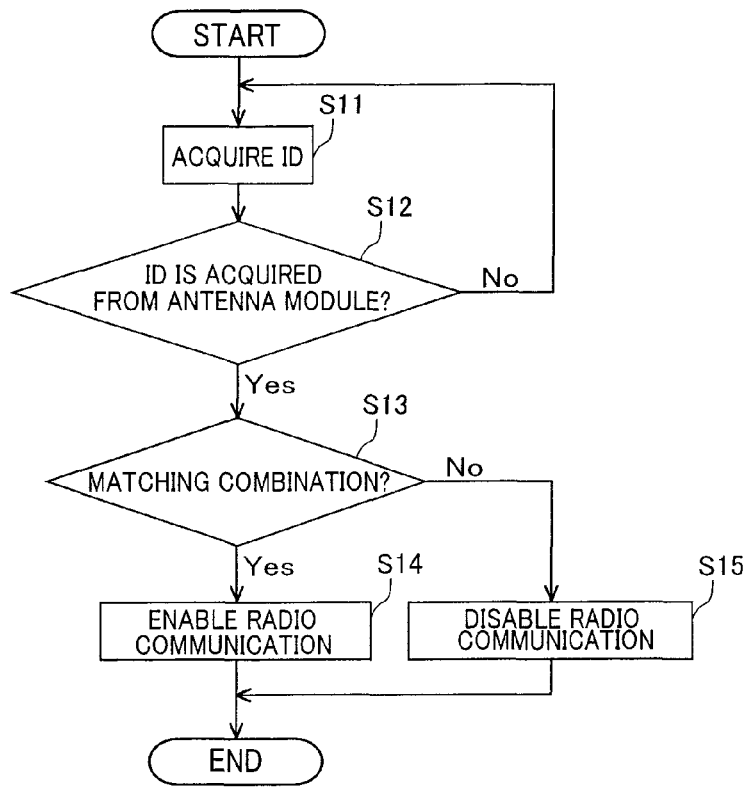
FIG. 13 is a flow chart for illustrating matching determination processing of the mobile phone according to the third embodiment of the present invention.

The mobile phone 300 according to the third embodiment comprises a mobile device body 301, the single selection antenna module 321 selected from a plurality of antenna modules 302 corresponding to a plurality of radio systems (an example of a radio communication standard) (GSM, 3G and WiMAX, for example) and the single selection circuit module 331 selected from a plurality of circuit modules 303 corresponding to a plurality of radio systems (GSM, 3G and WiMAX, for example) as shown in FIG. 12. The mobile phone 300 is mounted with a combination of the selection antenna module 321 and the selection circuit module 331 matched to each other in the radio systems, thereby enabling radio communication of a radio system corresponding to the combination. The selection antenna module 321 and the selection circuit module 331 constitute the "radio communication portion of a mobile device" in the present invention.

Each of the circuit modules 303 (selection circuit module 331) has the circuit side control portion 303a, a radio circuit 3b, a coupling terminal 3c and a ROM 303d.

The circuit side control portion 303a is provided to execute a processing program stored in the ROM 303d. The circuit side control portion 303a can communicate with the mobile device body 301 through an interface 3e. The circuit side control portion 303a executes matching determination processing as described later, when both the selection antenna module 321 and the selection circuit module 331 are inserted into the mobile device body 301.

The ROM 303d stores the processing program for executing the matching determination processing. Further, the ROM 303d stores a bit position table (see FIG. 3) formed similarly to that of the aforementioned first embodiment in order for the circuit side control portion 303a to determine whether or not the selection antenna module 321 and the selection circuit module 331 are matched to each other.

A body side control portion 318 of the mobile device body 301 is formed not to determine whether or not the selection antenna module 321 and the selection circuit module 331 are matched to each other and as to acquire a matching determination result from the circuit side control portion 303a of the selection circuit module 331 through an interface 19, dissimilarly to the aforementioned first embodiment. The body side control portion 318 moves a projecting portion 17a of a plunger 17 to bring the projecting portion 17a into engagement with a recess portion 21a of the selection antenna module 321 when the selection antenna module 321 and the selection circuit module 331 are matched to each other. The body side control portion 318 moves the projecting portion 17a of the plunger 17 to bring the projecting portion 17a into disengagement with the recess portion 21a of the selection antenna module 321 when the selection antenna module 321 and the selection circuit module 331 are not matched to each other. Further, the body side control portion 318 controls each part to output an error sound from a speaker 1a when the selection antenna module 321 and the selection circuit module 331 are not matched to each other.

The matching determination processing executed by the body side control portion 303a of the selection circuit module 331 of the mobile phone 300 according to the third embodiment is now described with reference to FIG. 13.

When inserting both the selection antenna module 321 and the selection circuit module 331 into the mobile device body 301, the matching determination processing is executed by the circuit side control portion 303a. The circuit side control portion 303a acquires ID information from a ROM 2d of the selection antenna module 321 at a step S11. Specifically, the ID information of the selection antenna module 321 is acquired by the circuit side control portion 303a of the selection circuit module 331 through the interface 3e after being acquired by the body side control portion 318 of the mobile device body 301. The circuit side control portion 303a determines whether or not the ID information has been acquired from the selection antenna module 321 at a step S12, and the steps S11 and S12 are repeated until the ID information is acquired. After acquiring the ID information from the selection antenna module 321, the circuit side control portion 303a determines whether or not a combination of the selection antenna module 321 and the selection circuit module 331 is a matching combination in the radio systems on the basis of the acquired ID information at a step S13. Specifically, the circuit side control portion 303a recognizes which of the radio systems the selection antenna module 321 corresponds to and determines whether or not the selection antenna module 321 and the selection circuit module 331 are matched to each other on the basis of the bit position table (see FIG. 3) of the ROM 303d and the acquired ID information of the selection antenna module 321.

When the selection antenna module 321 and the selection circuit module 331 are matched to each other, the circuit side control portion 303a enables radio communication by the mounted selection antenna module 321 and the mounted selection circuit module 331 at a step S14. Specifically, the circuit side control portion 303a starts transmitting and receiving various signals (sound signals and picture signals, for example) by radio communication between the circuit side control portion 303a and the selection antenna module 321 through a cable 1c on the basis of various signals (sound signals and picture signals, for example) transmitted and received between the circuit side control portion 303a and the body side control portion 318 of the mobile device body 301. Thus, radio communication with the selection circuit module 331 and the selection antenna module 321 starts.

When the selection antenna module 321 and the selection circuit module 331 are not matched to each other, on the other hand, the circuit side control portion 303a disables radio communication by the mounted selection antenna module 321 and the mounted selection circuit module 331 at a step S15. Specifically, the circuit side control portion 303a stops transmitting and receiving various signals (sound signals and picture signals, for example) by radio communication performed through the cable 1c between the selection circuit module 331 and the selection antenna module 321. Thus, radio communication with the selection circuit module 331 and the selection antenna module 321 stops.

The remaining structure of the third embodiment is similar to that of the aforementioned first embodiment.

According to the third embodiment, as hereinabove described, the circuit side control portion 303a of the selection circuit module 331 is formed to stop radio communication by the mobile device body 301 when the selection antenna module 321 and the selection circuit module 331 are not matched to each other, whereby violation of laws and regulations can be reliably prevented and a problem with communication caused by the selection antenna module 321 and the selection circuit module 331 not matched to each other can be reliably prevented from occurrence (prescribed communication performance can be reliably prevented from being unsatisfied and a damage of the selection circuit module 331 caused by a reflected wave from the selection antenna module 321 not matched to the selection circuit module 331 can be reliably prevented from occurrence, for example).

The remaining effects of the third embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned first to third embodiments is applied to the mobile phone as an exemplary mobile device, the present invention is not restricted to this. The present invention may alternatively be applied to another mobile device other than the mobile phone such as a PDA (Personal Digital Assistant) or a compact notebook computer.

While the plurality of antenna modules correspond to the plurality of radio systems such as GSM, 3G and WiMAX (an example of a radio communication standard) and the plurality of circuit modules correspond to the plurality of radio systems such as GSM, 3G and WiMAX in each of the aforementioned first to third embodiments, the present invention is not restricted to this. In the present invention, the plurality of antenna modules may alternatively correspond to different frequencies (another example of a radio communication standard) and the plurality of circuit modules may alternatively correspond to different frequencies.

While each of the antenna modules and each of the circuit modules correspond to a single radio system in each of the aforementioned first to third embodiments, the present invention is not restricted to this. In the present invention, each of the antenna modules and each of the circuit modules may alternatively correspond to a plurality of radio systems, or some of the antenna modules and some of the circuit modules may correspond to a single radio system and the remaining antenna modules and the remaining circuit modules may correspond to a plurality of radio systems.

While radio communication by the mobile device body is disabled by stopping transmitting and receiving various signals (sound signals and picture signals, for example) when the selection antenna module and the selection circuit module are not matched to each other in each of the aforementioned first to third embodiments, the present invention is not restricted to this. In the present invention, radio communication may alternatively be disabled by turning off the mobile device body when the selection antenna module and the selection circuit module are not matched to each other, for example.

Figure 14:
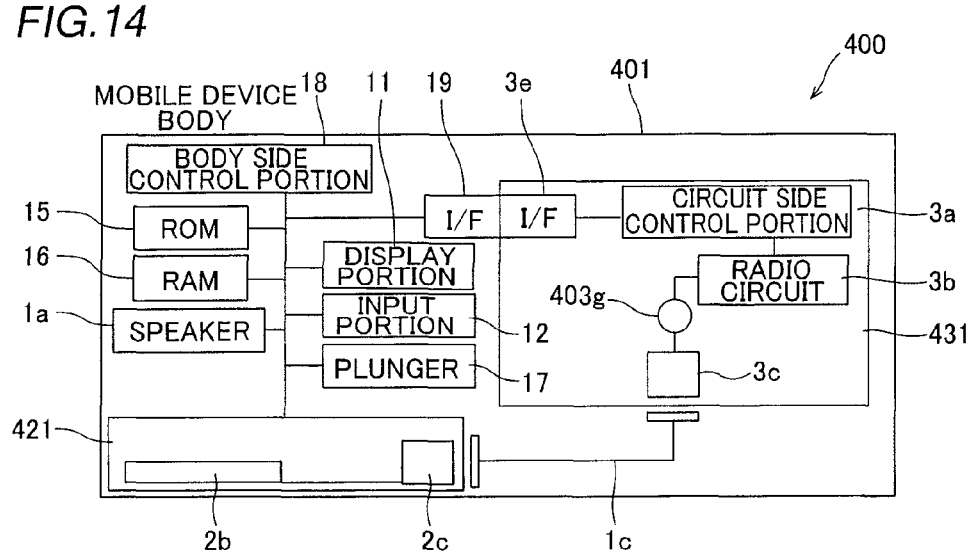
FIG. 14 is a block diagram showing a modification of each of the first to third embodiments of the present invention.

While whether or not the selection antenna module and the selection circuit module are matched to each other is determined on the basis of the identification information provided peculiarly with respect to at least the selection antenna module in each of the aforementioned first to third embodiments, the present invention is not restricted to this. In the present invention, a mobile phone may be formed as a modification shown in FIG. 14. According to this modification, a directional coupler 403g is provided between a radio circuit 3b and a coupling terminal 3c of the selection circuit module 431, and a size (characteristics) of a reflected wave of a signal wave transmitted from the selection circuit module 431 to the selection antenna module 421 is measured in a mobile phone 400 comprising a mobile device body 401, a selection antenna module 421 and a selection circuit module 431. Whether or not the selection antenna module 421 and the selection circuit module 431 are matched to each other is determined on the basis of the measured size of the reflected wave. At this time, it may be determined that the selection antenna module 421 and the selection circuit module 431 are not matched to each other, so far as the size of the reflected wave is at least a prescribed threshold value. Further, the mobile phone 400 may be so formed that whether or not the selection antenna module 421 and the selection circuit module 431 are matched to each other is determined on the basis of a standing wave ratio (value indicating a relation between a traveling wave and a reflected wave).

While the single body side control portion of the mobile device body determines whether or not the selection antenna module and the selection circuit module are matched to each other in each of the aforementioned first and second embodiments and the single circuit side control portion of the selection circuit module determines whether or not the selection antenna module and the selection circuit module are matched to each other in the aforementioned third embodiment, and radio communication is disabled when the selection antenna module and the selection circuit module are not matched to each other in each of the aforementioned first to third embodiments, the present invention is not restricted to this. In the present invention, the body side control portion of the mobile device body may alternatively determine whether or not the selection antenna module and the selection circuit module are matched to each other and the circuit side control portion of the selection circuit module may alternatively disable radio communication when the selection antenna module and the selection circuit module are not matched to each other, or the body side control portion of the mobile device body may alternatively disable radio communication when the selection antenna module and the selection circuit module are not matched to each other and the circuit side control portion of the selection circuit module may alternatively determine whether or not the selection antenna module and the selection circuit module are matched to each other. In other words, different control portions may make a matching determination and disable radio communication.

While the identification information of each of the antenna modules and each of the circuit modules is so formed as to correspond to 16 bits in each of the aforementioned first to third embodiments, the present invention is not restricted to this. In the present invention, the identification information may alternatively be so formed as to correspond to 8 bits, 32 bits or the like other than 16 bits.

Figure 15:
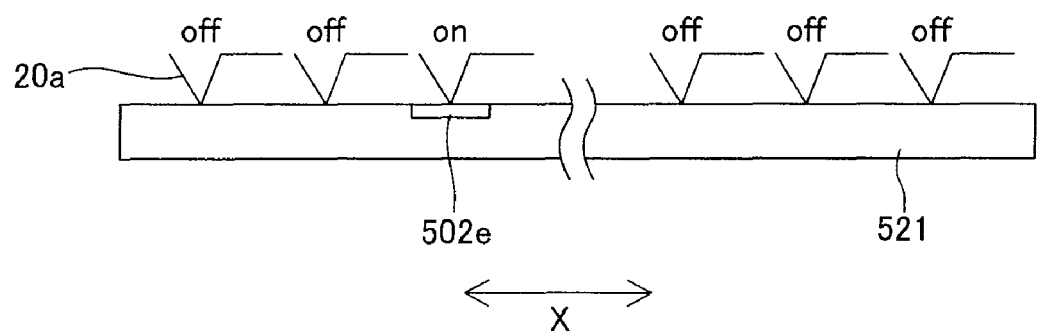
FIG. 15 illustrates the modification of the second embodiment of the present invention.

While the identification information of the selection antenna module and the selection circuit module is acquired on the basis of arrangement of the projecting portions provided as the first and second concavo-convex portions on the selection antenna module and the selection circuit module, respectively in the aforementioned second embodiment, the present invention is not restricted to this. In the present invention, a conductive terminal 502e may alternatively be provided on each of a selection antenna module 521 and a selection circuit module (not shown) in place of the projecting portion as shown in FIG. 15 and the identification information of the selection antenna module 521 and the selection circuit module (not shown) may alternatively be acquired on the basis of arrangement of the conductive terminal 502e.

While the control portion of the mobile device body determines whether or not the selection antenna module and the selection circuit module are matched to each other in the aforementioned second embodiment, the present invention is not restricted to this. In the present invention, the control portion of the selection circuit module may alternatively determine whether or not the selection antenna module and the selection circuit module are matched to each other. In this case, the projecting portion may alternatively be provided as the first concavo-convex portion only on the selection antenna module without providing the projecting portion as the second concavo-convex portion on the selection circuit module. Further, in this case, a conductive terminal may alternatively be provided on the selection antenna module in place of the projecting portion provided as the first concavo-convex portion and the identification information of the selection antenna module may alternatively be acquired on the basis of arrangement of the conductive terminal.

While the sixteen arrangement regions are so provided on each of the antenna modules and each of the circuit modules as to correspond to 16 bits in the aforementioned second embodiment, the present invention is not restricted to this. In the present invention, only eight arrangement regions may alternatively be provided and be so formed as to correspond to 16 bits, for example. In this case, a plurality of projecting portions may alternatively be so formed as to correspond to 16 bits by a combination of arrangement of these.

While mounting of the selection antenna module on the mobile device body is released when the selection antenna module and the selection circuit module are not matched to each other in each of the aforementioned first to third embodiments, the present invention is not restricted to this. In the present invention, mounting of the selection circuit module on the mobile device body may alternatively be released or mounting of both the selection antenna module and the selection circuit module on the mobile device body may alternatively be released when the selection antenna module and the selection circuit module are not matched to each other.

While a user is notified by the error sound that a combination of the selection antenna module and the selection circuit module is not a matching combination in each of the aforementioned first to third embodiments, the present invention is not restricted to this. In the present invention, the mobile device may alternatively be formed to notify a user that a combination of the selection antenna module and the selection circuit module is not a matching combination by displaying an error screen including a message that a combination of the selection antenna module and the selection circuit module is not a matching combination on the display portion, or the mobile device may alternatively be formed to notify a user of an error by a vibrator, for example.

While the selection antenna module and the selection circuit module are connected to each other through electrostatic coupling enabling transmission of a high-frequency signal when the selection antenna module and the selection circuit module are matched to each other in each of the aforementioned first to third embodiments, the present invention is not restricted to this. In the present invention, the selection antenna module and the selection circuit module may alternatively be connected to each other through magnetic coupling enabling transmission of a high-frequency signal when the selection antenna module and the selection circuit module are matched to each other.

What is claimed is:
1. A mobile device comprising:
a mobile device body;
a single selection antenna module mountable on said mobile device body, selected from a plurality of antenna modules corresponding to a plurality of radio communication standards;
a single selection circuit module mountable on said mobile device body, selected from a plurality of circuit modules corresponding to a plurality of radio communication standards; and
a control portion determining whether or not a combination of said selection antenna module and said selection circuit module is a matching combination in radio communication standards, wherein
said control portion is formed to control radio communication by said selection antenna module and said selection circuit module to be disabled when determining that said selection antenna module and said selection circuit module are not matched to each other and control radio communication of a radio communication standard corresponding to said selection antenna module and said selection circuit module to be enabled when determining that said selection antenna module and said selection circuit module are matched to each other,
said control portion is formed to acquire information or characteristics for determining whether or not said selection antenna module and said selection circuit module are matched to each other from at least said selection antenna module and determine whether or not said selection antenna module and said selection circuit module are matched to each other on the basis of acquired said information or characteristics, said control portion is formed to acquire first identification information provided peculiarly with respect to said selection antenna module and determine whether or not said selection antenna module and said selection circuit module are matched to each other on the basis of acquired said first identification information, said control portion includes a body side control portion provided in said mobile device body, said body side control portion is formed to acquire said first identification information of said selection antenna module and second identification information provided peculiarly with respect to said selection circuit module and determine whether or not said selection antenna module and said selection circuit module are matched to each other on the basis of acquired said first identification information and said second identification information, and is formed to disable radio communication by controlling radio communication by said mobile device body to be stopped when said selection antenna module and said selection circuit module are not matched to each other and enable radio communication when said selection antenna module and said selection circuit module are matched to each other, said selection antenna module has a first conductive terminal or a first concavo-convex portion so arranged as to correspond to said first identification information, said selection circuit module has a second conductive terminal or a second concavo-convex portion so arranged as to correspond to said second identification information, and said body side control portion is formed to acquire said first identification information of said selection antenna module on the basis of arrangement of said first conductive terminal or said first concavo-convex portion and acquire said second identification information of said selection circuit module on the basis of arrangement of said second conductive terminal or said second concavo-convex portion.

2. The mobile device according to claim 1, wherein said selection antenna module and said selection circuit module are formed to transmit a high-frequency signal to each other without contact when said selection antenna module and said selection circuit module are matched to each other.

3. The mobile device according to claim 1, wherein said selection antenna module and said selection circuit module include a first storage portion storing said first identification information and a second storage portion storing said second identification information, respectively, and said body side control portion is formed to acquire said first identification information and said second identification information by reading out said first identification information and said second identification information from said first storage portion and said second storage portion, respectively.

4. The mobile device according to claim 1 wherein said control portion is formed to determine whether or not said selection antenna module and said selection circuit module are matched to each other on the basis of said characteristics regarding a size of a reflected wave from said selection antenna module, of a signal wave transmitted from said selection circuit module to said selection antenna module.

5. A mobile device comprising:

a mobile device body;

a single selection antenna module mountable on said mobile device body, selected from a plurality of antenna modules corresponding to a plurality of radio communication standards;

a single selection circuit module mountable on said mobile device body, selected from a plurality of circuit modules corresponding to a plurality of radio communication standards; and a control portion determining whether or not a combination of said selection antenna module and said selection circuit module is a matching combination in radio communication standards, wherein said control portion is formed to control radio communication by said selection antenna module and said selection circuit module to be disabled when determining that said selection antenna module and said selection circuit module are not matched to each other and control radio communication of a radio communication standard corresponding to said selection antenna module and said selection circuit module to be enabled when determining that said selection antenna module and said selection circuit module are matched to each other, said control portion is formed to acquire information or characteristics for determining whether or not said selection antenna module and said selection circuit module are matched to each other from at least said selection antenna module and determine whether or not said selection antenna module and said selection circuit module are matched to each other on the basis of acquired said information or characteristics, said control portion is formed to acquire first identification information provided peculiarly with respect to said selection antenna module and determine whether or not said selection antenna module and said selection circuit module are matched to each other on the basis of acquired said first identification information said control portion includes a circuit side control portion provided in said selection circuit module, said circuit side control portion is formed to disable radio communication by controlling radio communication by said mobile device body to be stopped when said selection antenna module and said selection circuit module are not matched to each other and enable radio communication when said selection antenna module and said selection circuit module are matched to each other, said selection antenna module has a first conductive terminal or a first concavo-convex portion so arranged as to correspond to said first identification information, and said circuit side control portion is formed to acquire said first identification information of said selection antenna module on the basis of arrangement of said first conductive terminal or said first concavo-convex portion.

6. The mobile device according to claim 5, wherein said selection antenna module includes a first storage portion storing said first identification information, and said circuit side control portion is formed to acquire said first identification information by reading out said first identification information from said first storage portion.

7. A radio communication portion of a mobile device comprising:

a single selection antenna module mountable on a mobile device body, selected from a plurality of antenna modules corresponding to a plurality of radio communication standards; and a single selection circuit module mountable on said mobile device body, selected from a plurality of circuit modules corresponding to a plurality of radio communication standards, wherein said selection circuit module includes a circuit side control portion determining whether or not a combination of said selection antenna module and said selection circuit module is a matching combination in radio communication standards, and controlling radio communication by said selection antenna module and said selection circuit module to be disabled when determining that said selection antenna module and said selection circuit module are not matched to each other and controlling radio communication of a radio communication standard corresponding to said selection antenna module and said selection circuit module to be enabled when determining that said selection antenna module and said selection circuit module are matched to each other, said control portion is formed to acquire information or characteristics for determining whether or not said selection antenna module and said selection circuit module are matched to each other from at least said selection antenna module and determine whether or not said selection antenna module and said selection circuit module are matched to each other on the basis of acquired said information or characteristics, said control portion is formed to acquire first identification information provided peculiarly with respect to said selection antenna module and determine whether or not said selection antenna module and said selection circuit module are matched to each other on the basis of acquired said first identification information, said control portion includes a circuit side control portion provided in said selection circuit module, said circuit side control portion is formed to disable radio communication by controlling radio communication by said mobile device body to be stopped when said selection antenna module and said selection circuit module are not matched to each other and enable radio communication when said selection antenna module and said selection circuit module are matched to each other, said selection antenna module has a first conductive terminal or a first concavo-convex portion so arranged as to correspond to said first identification information, and said circuit side control portion is formed to acquire said first identification information of said selection antenna module on the basis of arrangement of said first conductive terminal or said first concavo-convex portion.

8. The radio communication portion of a mobile device according to claim 7, wherein said selection antenna module and said selection circuit module are formed to transmit a high-frequency signal to each other without contact when said selection antenna module and said selection circuit module are matched to each other.

* * * * *